(12) United States Patent
Crawford

(10) Patent No.: US 9,781,063 B2
(45) Date of Patent: Oct. 3, 2017

(54) SYSTEM AND METHOD FOR ALERTING A LIST OF MULTIPLE RECIPIENTS OF A USER'S REQUEST FOR ASSISTANCE

(71) Applicant: AT&T Mobility II LLC, Atlanta, GA (US)

(72) Inventor: Jerry Crawford, Dallas, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 374 days.

(21) Appl. No.: 14/508,630

(22) Filed: Oct. 7, 2014

(65) Prior Publication Data
US 2016/0099895 A1    Apr. 7, 2016

(51) Int. Cl.
H04L 12/18    (2006.01)
H04L 12/58    (2006.01)
H04L 29/12    (2006.01)

(52) U.S. Cl.
CPC ........ *H04L 51/046* (2013.01); *H04L 12/1895* (2013.01); *H04L 51/20* (2013.01); *H04L 61/1594* (2013.01)

(58) Field of Classification Search
CPC ............... H04L 51/046; H04L 12/1895; H04L 61/1594; H04L 51/20
See application file for complete search history.

(56) References Cited

U.S. PATENT DOCUMENTS 5,805,670 A * 9/1998 Pons .................... G08B 25/016
379/37
6,201,856 B1 * 3/2001 Orwick ................ H04Q 3/0029
379/40
(Continued)

FOREIGN PATENT DOCUMENTS

CN        101990030 A      3/2011
CN        103027671 A      4/2013
(Continued)

OTHER PUBLICATIONS

Singh, Jatinder Paul, "BlackBerry Has Some Useful Emergency Alert Apps," May 29, 2014, http://www.techvorm.com/blackberry-useful-emergency-alert-apps/, 3 pgs.
(Continued)

*Primary Examiner* — Uzma Alam
(74) *Attorney, Agent, or Firm* — Chiesa Shahinian & Giantomasi PC

(57) ABSTRACT

A request for assistance from a user employing a first user device is received. The request is converted into a plurality of formatted requests. Each formatted request is formatted for receipt by a respective recipient in the list of recipients. Each of the plurality of formatted requests is broadcasted to each respective recipient in the list of recipients. A location of the first user device is provided to each recipient in the list of recipients. An assistance response to the request is received. The assistance response is sent by a particular recipient in the list of recipients. A message is broadcasted to each recipient in the list of recipients, other than the particular recipient, indicating that the particular recipient provided the assistance response. Upon receiving an update message from the particular recipient, the update message is broadcasted to each recipient in the list of recipients other than the particular recipient.

17 Claims, 9 Drawing Sheets

(56) References Cited

U.S. PATENT DOCUMENTS

| | | | | |
|---|---|---|---|---|
| 6,427,001 | B1* | 7/2002 | Contractor | H04Q 3/0045 370/410 |
| 7,046,140 | B2* | 5/2006 | Adamczyk | G08B 25/005 340/506 |
| 7,162,236 | B2* | 1/2007 | Dorenbosch | H04W 76/02 370/338 |
| 7,212,111 | B2* | 5/2007 | Tupler | G08B 25/08 340/539.18 |
| 7,577,420 | B2 | 8/2009 | Srinivasan et al. | |
| 7,747,695 | B1* | 6/2010 | Morris | G06F 9/542 705/5 |
| 7,787,609 | B1* | 8/2010 | Flockhart | H04M 3/5233 379/265.01 |
| 7,974,771 | B2* | 7/2011 | Cobbold | G06Q 10/10 701/117 |
| 8,009,822 | B1* | 8/2011 | Boutcher | H04M 3/5125 379/265.1 |
| 8,380,162 | B2* | 2/2013 | Matsuo | H04L 12/1895 455/404.1 |
| 8,401,154 | B2 | 3/2013 | Boni et al. | |
| 8,441,356 | B1 | 5/2013 | Tedesco et al. | |
| 8,467,500 | B2* | 6/2013 | Hidajat | H04M 1/2473 379/37 |
| 8,478,229 | B2* | 7/2013 | Velusamy | H04L 51/20 379/45 |
| 8,489,063 | B2 | 7/2013 | Petite | |
| 8,509,732 | B1* | 8/2013 | Venkatraman | H04M 11/04 455/404.2 |
| 8,533,612 | B2 | 9/2013 | Hochendoner et al. | |
| 8,537,687 | B2* | 9/2013 | Valdez | H04M 7/0057 370/238 |
| 8,538,374 | B1 | 9/2013 | Haimo et al. | |
| 8,576,066 | B2* | 11/2013 | Bivens | G08B 25/003 340/539.13 |
| 8,600,337 | B2* | 12/2013 | Rothschild | G08B 25/001 455/404.1 |
| 8,618,927 | B2* | 12/2013 | Wohlert | H04M 11/04 340/531 |
| 8,633,818 | B2* | 1/2014 | Anson | G08B 25/016 340/425.5 |
| 8,649,759 | B2* | 2/2014 | Scott | H04M 1/2745 455/404.1 |
| 8,700,066 | B1* | 4/2014 | Buchhop | H04W 4/22 455/404.1 |
| 8,798,647 | B1* | 8/2014 | Haney | H04W 4/08 455/456.3 |
| 8,819,153 | B1* | 8/2014 | Fish | H04L 51/04 709/206 |
| 8,842,810 | B2* | 9/2014 | Lieu | H04W 4/22 379/39 |
| 8,917,861 | B2* | 12/2014 | Clayton | H04M 3/42374 379/265.12 |
| 8,958,849 | B2* | 2/2015 | Aldossary | H04M 1/0202 455/404.2 |
| 9,218,432 | B2* | 12/2015 | Miasnik | G06F 17/30861 |
| 9,241,069 | B2* | 1/2016 | Mohler | H04M 3/5116 |
| 9,247,408 | B2* | 1/2016 | South | H04W 4/22 |
| 9,262,908 | B2* | 2/2016 | Mohler | G08B 27/005 |
| 9,332,122 | B2* | 5/2016 | Zeigler | H04M 3/5116 |
| 9,414,212 | B2* | 8/2016 | Nokhoudian | H04W 4/22 |
| 9,414,214 | B2* | 8/2016 | Hobby | H04W 4/22 |
| 9,467,834 | B2* | 10/2016 | Guday | H04W 4/22 |
| 2002/0076003 | A1* | 6/2002 | Zellner | G08B 25/08 379/49 |
| 2005/0085215 | A1 | 4/2005 | Kokko et al. | |
| 2006/0203993 | A1* | 9/2006 | Busey | H04M 3/5191 379/265.09 |
| 2007/0086584 | A1* | 4/2007 | Rossini | H04M 3/5233 379/222 |
| 2008/0304630 | A1* | 12/2008 | Nguyen | G08B 25/006 379/45 |
| 2009/0298461 | A1* | 12/2009 | O'Reilly | H04M 1/72572 455/404.2 |
| 2010/0003946 | A1 | 1/2010 | Ray et al. | |
| 2010/0267357 | A1* | 10/2010 | Holmstrom | H04M 1/72541 455/404.1 |
| 2010/0297980 | A1 | 11/2010 | Alberth et al. | |
| 2010/0297981 | A1 | 11/2010 | Ballantyne et al. | |
| 2010/0309814 | A1* | 12/2010 | Wang | H04L 12/1818 370/254 |
| 2011/0117878 | A1* | 5/2011 | Barash | G08B 21/0211 455/404.2 |
| 2012/0003952 | A1 | 1/2012 | Gabriel | |
| 2012/0171988 | A1 | 7/2012 | Matsuo et al. | |
| 2012/0246089 | A1 | 9/2012 | Sikes | |
| 2013/0040596 | A1 | 2/2013 | Paim et al. | |
| 2013/0142194 | A1* | 6/2013 | Ku | H04L 29/1216 370/352 |
| 2013/0172017 | A1 | 7/2013 | Wang | |
| 2013/0222133 | A1 | 8/2013 | Schultz et al. | |
| 2013/0301631 | A1* | 11/2013 | Hegde | H04W 16/14 370/345 |
| 2013/0339062 | A1 | 12/2013 | Brewer et al. | |
| 2014/0155018 | A1* | 6/2014 | Fan | H04W 72/048 455/404.1 |
| 2014/0177812 | A1 | 6/2014 | Barrett | |
| 2015/0065081 | A1* | 3/2015 | Estes | H04W 4/021 455/404.2 |
| 2015/0279187 | A1* | 10/2015 | Kranz | G08B 21/0415 340/539.12 |

FOREIGN PATENT DOCUMENTS

| | | |
|---|---|---|
| CN | 103685739 A | 3/2014 |
| JP | 2011238189 A | 11/2011 |
| JP | 2013117839 A | 6/2013 |

OTHER PUBLICATIONS

McCubbin, John, "Micro-blogging in Emergencies—Lessons from maritime search and rescue," Aug. 14, 2013, http://i-logue.com/micro-blogging-in-emergencies/, 7 pgs.

Admin, "Best and Must to Have Android Apps for Senior Citzens—Safety Net," Mar. 31, 2012, http://www.hacktik.com/best-and-must-to-have-android-apps-for-senior-citizens.html/, 10 pgs.

"Truly Rich Recommendations: React Mobile—An App That Enhances Family Safety," Nov. 30, 2013, http://trulyrichmom.com/truly-rich-recommendations-react-mobile-an-app-that-enhances-family-safety/, 19 pgs.

* cited by examiner

LIST 407

| NAME | PREFERRED CONTACT METHOD | EMAIL | MOBILE NUMBER | LANDLINE NUMBER | PHONE | LISTED IN |
|---|---|---|---|---|---|---|
| *MARTHA* | PHONE | Mar@hme.com | | | 666666 | CORE NETWORK, FAMILY, CO-WORKERS |
| DENNIS DUDLEY | EMAIL | Denn@Dud.com | 888888 | 777777 | | BUDS |
| *AUNT BERTHA* | LANDLINE NUMBER | | | 999999 | | CORE NETWORK, FAMILY |
| *TIMOTHY ALLEN* | EMAIL, TEXT | Tim@tool.com | 111111 | 222222 | | CORE NETWORK, NEIGHBORS |

702 — PREFERRED CONTACT METHOD column
704 — LISTED IN column

FIG. 7

SYSTEM AND METHOD FOR ALERTING A LIST OF MULTIPLE RECIPIENTS OF A USER'S REQUEST FOR ASSISTANCE

FIELD

The present disclosure relates generally to a system and method for alerting a list of multiple recipients of a user's request for assistance and more particularly to a system and method for alerting a list of multiple recipients of a user's request for assistance and providing an update to the list of recipients when assistance is provided to the user.

BACKGROUND

When a person wishes to request assistance from a single person or agency, the person contacts the person or agency directly by calling, texting, emailing, etc. However, if a person needs to contact one or more people in a group of people, he/she cannot efficiently do so, as he/she would have to contact each individual in the group of people by calling, texting, emailing, etc. each of them. Suppose that a person requires assistance and would like any one of a select group of friends to offer help. The person would have to manually message each of his friends to see which one is available to assist. This process is time consuming because the person may not be sure of the best way to reach his friends. For example, one friend may be at work and is only able to receive a Short Message Service (SMS) message or an email; another may be at home playing video games and can only be contacted through his video gaming system. If the person places a phone call to all his friends, he may not be able to reach the friend who is at work and the other friend who is playing video games. Contacting people on an individual basis by calling, texting, emailing, etc. each of them is an inefficient way of requesting assistance.

BRIEF SUMMARY

The present application provides a method, system and computer readable medium for alerting recipients that a user is requesting assistance. A request for assistance from a user employing a first user device is received. The request is converted into a plurality of formatted requests. Each formatted request is formatted for receipt by a respective recipient in the list of recipients. Each of the plurality of formatted requests is broadcasted to each respective recipient in the list of recipients. A location of the first user device is provided to each recipient in the list of recipients. An assistance response to the request is received. The assistance response is sent by a particular recipient in the list of recipients. A message is broadcasted to each recipient in the list of recipients, other than the particular recipient, indicating that the particular recipient provided the assistance response. Upon receiving an update message from the particular recipient, the update message is broadcasted to each recipient in the list of recipients other than the particular recipient.

In accordance with an embodiment, communication with each recipient in the list of recipients other than the particular recipient is locked out to prevent additional duplicate assistance responses.

In accordance with an embodiment, an indication that the particular recipient has not completed assisting the user is received. Communication with each recipient in the list of recipients other than the particular recipient is unlocked. A second assistance response to the request sent by a second recipient in the list of recipients is received.

In accordance with an embodiment, the assistance response is received within a specified time.

In accordance with an embodiment, the particular recipient is employing a second user device. Traveling directions from the location of the first user device to a location of the second user device are determined. The traveling directions are provided to the particular recipient.

In accordance with an embodiment, the request for assistance is a request for help and one of the recipients of the list of recipients is an emergency authority.

In accordance with an embodiment, a portion of the list of recipients is included in a core network. The core network is expanded to include additional recipients. Each of the plurality of formatted requests is broadcasted to a respective recipient of the additional recipients. If a response to the request is not received, the core network is expanded to include more recipients in addition to the additional recipients These and other advantages of the invention will be apparent to those of ordinary skill in the art by reference to the following detailed description and the accompanying drawings.

BRIEF DESCRIPTION OF THE DRAWINGS

FIG. 7 depicts an exemplary list of recipients, in accordance with an embodiment;

DETAILED DESCRIPTION

The present application provides an easy, efficient, and fast method and system for alerting people included in a list of recipients that a user requires assistance. Some examples of the request for assistance may be related to a medical emergency, an emergency due to stranger danger, a non-emergency requiring help when a user is lost, and other urgent and non-urgent scenarios. Although each person in the list of recipients is alerted of the request for assistance, in order to curtail multiple responses to the request, each person in the list of recipients is informed of all updates so that multiple and/or uncoordinated responses to the request are prevented. Parallel messaging is used to inform and update the system. This way, each person in the list of recipients is informed when a user needs assistance in a certain situation and which recipient is addressing the problem. The recipients in the list of recipients also receive status updates related to the user requesting assistance.

By using parallel messaging to inform and update the system, people included the list of recipients are informed that creator of the list of recipients is need of assistance in a certain situation, who is addressing the problem, and receive status updates.

Figure 1:
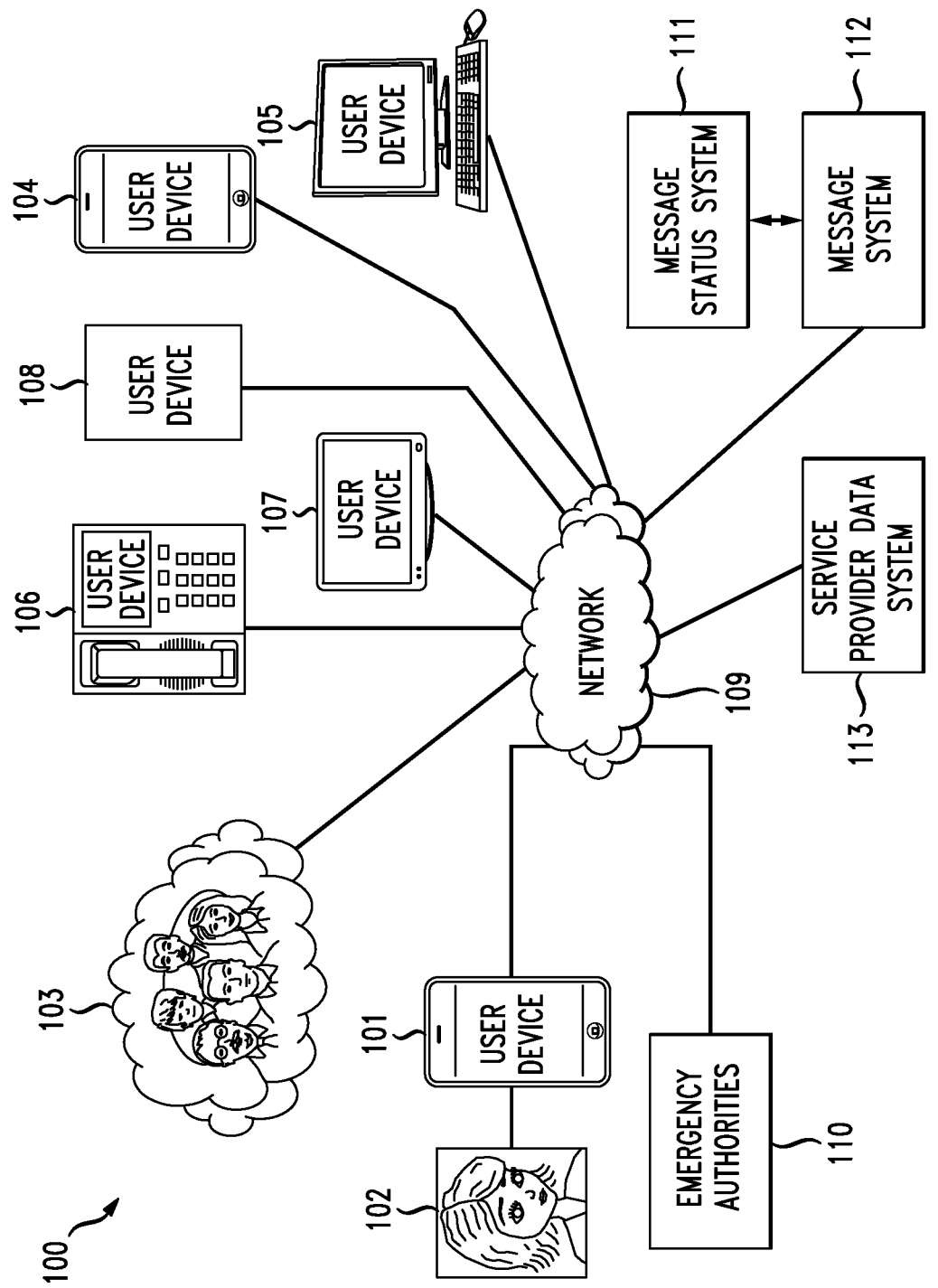
FIG. 1 depicts a system for providing assistance to a user, in accordance with an embodiment.

FIG. 1 depicts a system for providing assistance to a user, in accordance with an embodiment. System 100 includes a user device 101, a user 102 employing user device 101, recipients 103, a user device 104, a user device 105, a user device 106, a user device 107, a user device 108, a network 109, emergency authorities 110, message status system 111, message system 112, and service provider data system 113.

In the exemplary embodiment of FIG. 1, network 109 is the Internet. In other embodiments, network 109 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 109 may include a combination of different types of networks.

User device 101 may be connected to network 109 through a direct (wired) link, or wirelessly. User device 101 may have a display screen for displaying information. For example, user device 101 may be a personal computer, a laptop computer, a workstation, a mainframe computer, a mobile communication device such as a wireless phone, a personal digital assistant, cellular device, a laptop computer, a netbook, a tablet device, a wearable device, a smart device, etc. Other devices may be used.

Message status system 111 communicates directly with message system 112, as depicted in FIG. 1. The communication may be through a private network such as a virtual private network (VPN). The communication may be established through an Intranet via a direct (wired) link, or wirelessly.

Figure 4:
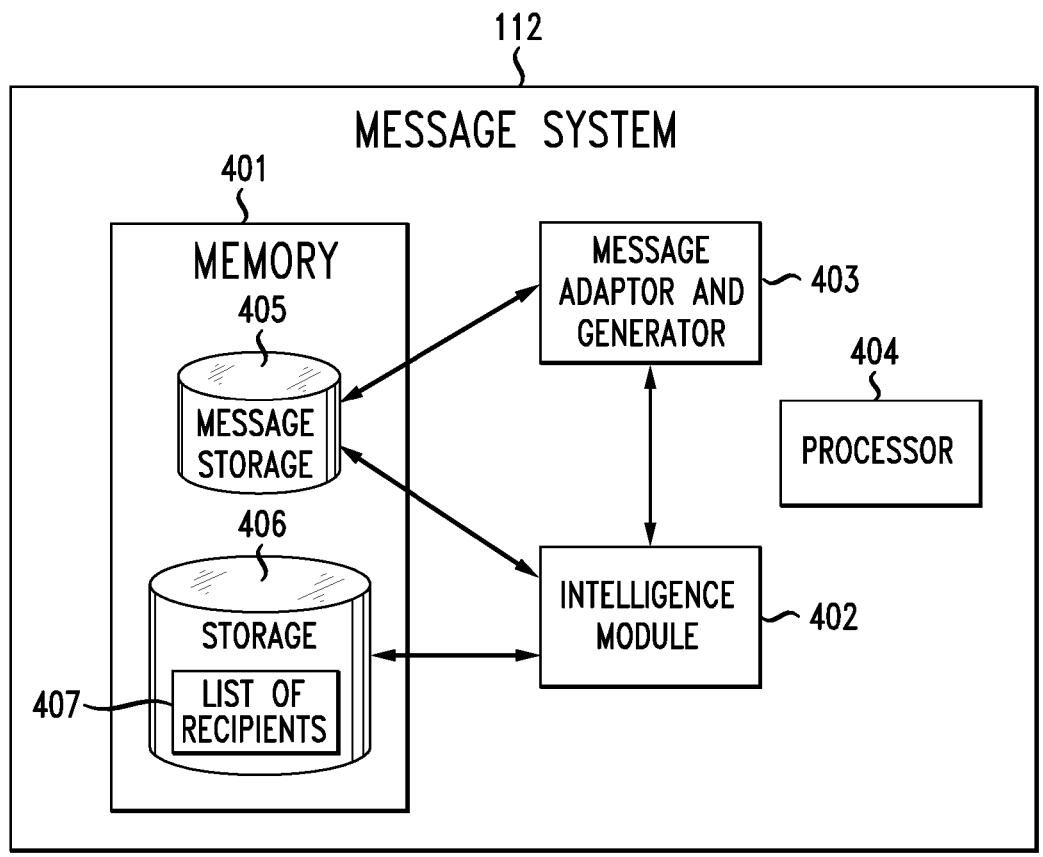
FIG. 4 depicts functional components a message system, in accordance with an embodiment.

Each of user devices 104 through 108 in FIG. 1 may be connected to network 109 through a directed (wired) link, or wirelessly. Names (or user names, avatars, etc.) and contact information of recipients 103 employing user devices 104 through 108 may be listed as a list of recipients 407 in storage 406, in a memory 401 in message system 112, as shown in FIG. 4. In an embodiment, contact information of recipients 103 may be stored online in a cloud server, such as message system 112 or elsewhere. Contact information of recipients 103 stored in the list of recipients 407 may otherwise be accessible by message system 112 and stored externally. Details regarding contact information of recipients 103 included in a list of recipients 407 (shown in FIG. 7) are described herein.

Figure 2:
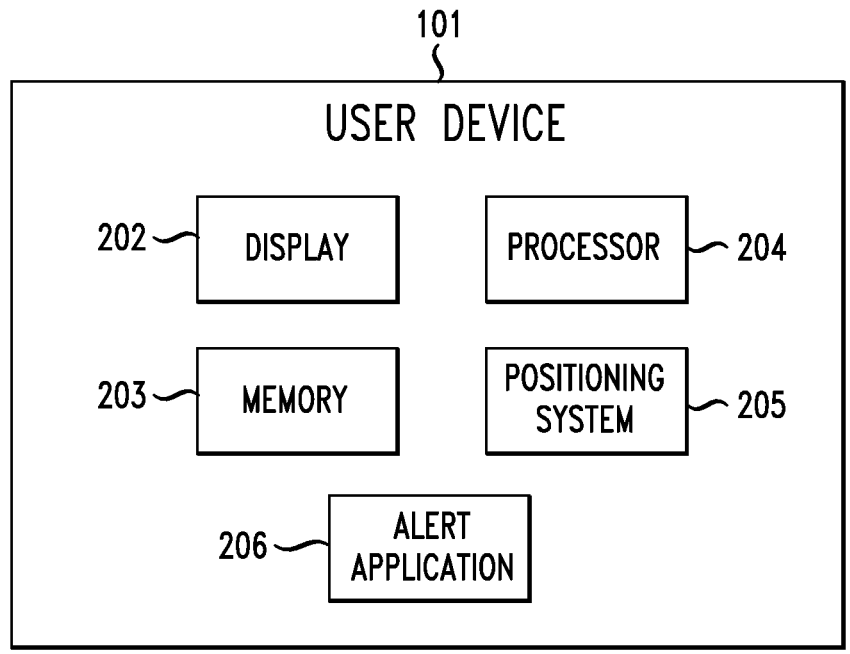
FIG. 2 depicts functional components of an exemplary user device, in accordance with an embodiment.

FIG. 2 depicts functional components of an exemplary user device, in accordance with an embodiment. User device 101 includes a display 202, a memory 203, a processor 204, a positioning system 205, and an alert application 206. Alert application 206 allows a user employing user device 101 to send an alert to multiple recipients when the user requests assistance. Positioning system 205 may be a Global Positioning System (GPS), a GPS application, a locator beacon, etc. In the depicted embodiment, user device 101 belongs to user 102 who requests assistance.

Display 202 provides display of webpages, emails, documents, text, images, videos, and other information.

If user 102 requests assistance using user device 101, memory 203 may store a copy of the request for assistance issued by user device 101. Memory 203 may also store other data including a current location of user device 101 (as determined by positioning system 205), a current date, a current time, and other information concerning user device 101.

When user 102 employing user device 101 wishes to activate a request for assistance, user device 101 communicates the request to message system 112. Along with the request for assistance, user device 101 may transmit a current location of user device 101, a day, a date, a time, a nature of the request (e.g., whether it's an emergency event, or a non-emergency event), and other information that would be helpful in providing assistance to the user.

In an embodiment, user device 104, user device 105, user device 107, and user device 108 shown in FIG. 1 each have the alert application installed thereon.

Figure 3:
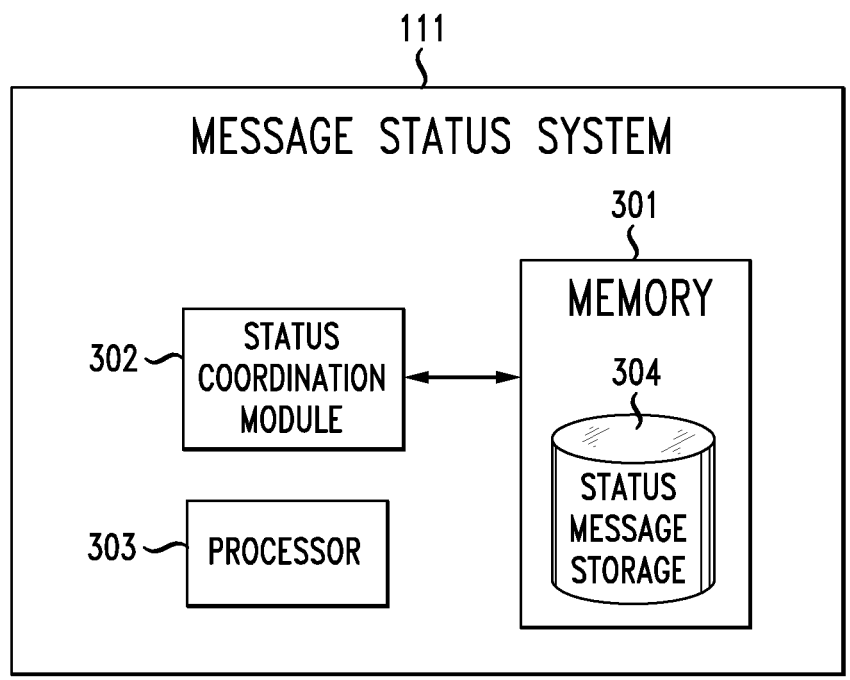
FIG. 3 depicts functional components of a message status system, in accordance with an embodiment.

FIG. 3 depicts functional components of a message status system 111, in accordance with an embodiment. Message status system 111 includes a memory 301, a status coordination module 302, and a processor 303. Memory 301 includes a status message storage 304.

FIG. 4 depicts functional components of a message system 112, in accordance with an embodiment. Message system 112 includes a memory 401, an intelligence module 402, a message adaptor and generator 403, and a processor 404. Memory 101 includes a message storage 405 and a storage 406. Storage 406 stores the list of recipients 407. Message system 112 receives a request for assistance sent by a user. Message system 112 keeps recipients 103 apprised of all developments and updates and prevents multiple responses to the user's request for assistance by communicating with message status system 111. Message status system 111 stores all communication between the user and the recipients and instructs message system 112 to act based on the communication. Message system 112 provides the recipients with information regarding the request, who is and/or has responded to the request, the current status of the request (e.g., whether the issue is resolved, in the process of being resolved, or unresolved), the location, day, date, time of the sender request, and the resolution to the request for assistance. Message system 112 stores contact information regarding recipients 103 in a list of recipients 407 in storage 406. The information stored as part of the list of recipients 407 may include contact information such as recipient email addresses, recipient mobile phone numbers, recipient landline numbers, etc. Contact information may also include preferred contact methods of each of the recipients, secondary contact methods of each of the recipients, which group(s) the recipients belong to, etc.

Figure 5:
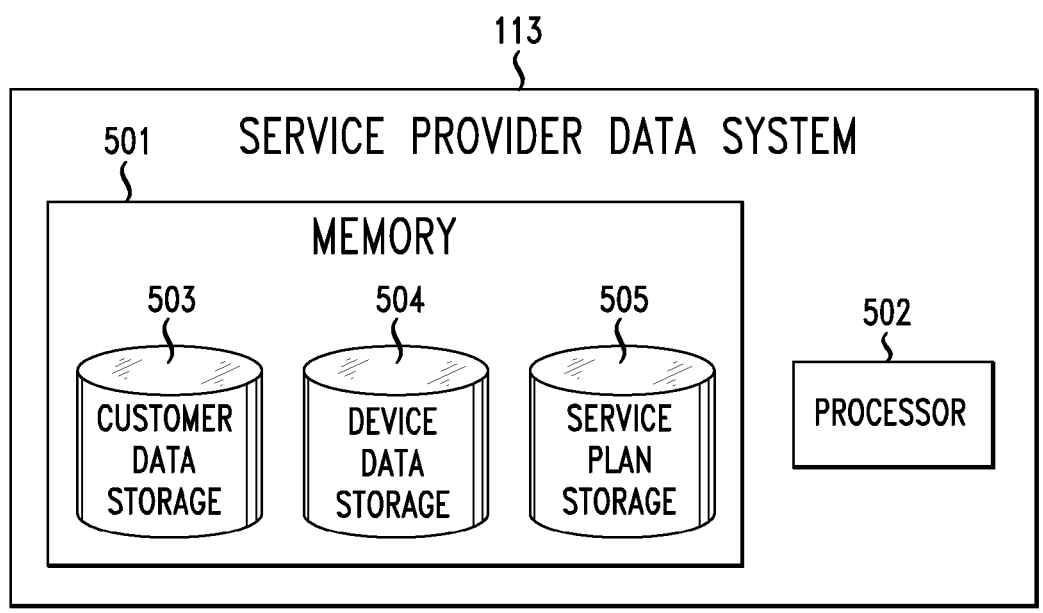
FIG. 5 depicts functional components of a service provider data system, in accordance with an embodiment.

FIG. 5 depicts functional components of a service provider data system 113, in accordance with an embodiment. Service provider data system 113 includes a memory 501 and a processor 502. Memory 501 includes a customer data storage 503, a device data storage 504, and a service plan storage 505. Service provider data system 113 retains details regarding recipients (e.g., details related to recipient phone numbers).

An administrator in charge of a system for alerting multiple recipients creates a list of recipients 407. The list of recipients 407 is maintained in storage 406. The administrator may be user 102 or another user (as described below). The administrator employs a user device (e.g., if the administrator is user 102, user 102 employs user device 101 or another device) to create the list. The administrator utilizes a web interface provided by an alert application in order to create the list. The administrator uses the web interface to communicate list information to message system 112. In the depicted embodiment, the list information includes the list of recipients along with contact information of each of the list of recipients that may be stored within storage 406. In other embodiments, the list may be stored at user device 101, in a cloud server, and/or elsewhere. The administrator and/or user 102 may create the list by visiting a website managed by message system 112 and create the list on the website, via network 109. User 102 may create the list using a mobile application (e.g., an alert application) or other application. The list may be stored online such that user 102 can access the list any time by logging onto the website, cloud server, or application. The administrator and/or user 102 creates the list of recipients so that one or more of the recipients on the list are informed when the user requests help. Details regarding the user's help request are described herein with respect to FIG. 6A.

Details regarding the list of recipients are described in FIG. 7. FIG. 7 depicts an exemplary list of recipients, in accordance with an embodiment. User 102 creates a list of recipients 407. User 102 may create the list by inserting a name of a person and contact information of the person (email address, mobile phone number, landline number, phone number, etc.). Each person in the list may have one or more associated pictures, avatars, other graphics, etc., that are provided in the list of recipients 407. For each person in the list, a preferred contact method 702 may selected. For example, if a user has a phone number and an email address listed, the preferred contact method for the user may be selected as email. Additional contact methods including secondary contact methods, etc. may also be listed. The list of recipients 407 includes a column called "Listed in" 704. This column identifies which group(s) a recipient belongs to. Groups include a core network, family, co-Workers, buds, neighbors, etc. Other groups may be created by user 102. Each of the groups may be associated with a nature of a request for assistance. For example, recipients listed in the family group may include recipients to contact in case the nature of the request for assistance is indicative of an emergency. Recipients listed in the buds group may include recipients to contact in case the nature of the request for assistance is indicative of a non-emergency. Recipients in the core network will always receive a request sent by user 102, regardless of the nature of the request. Details regarding the core network are described below. In the exemplary embodiment depicted in FIG. 7, Martha may be listed in the core network, family, and co-workers groups.

The list of recipients 407 may include additional columns indicating additional contact methods. Additional contact methods include a user identification of a person subscribed to a service, a user name or handle of a device's application, etc.

In an embodiment, multiple people may create, access and update the list of recipients 407. For example, a family including a mother, a father, a sister and a brother may all access and share a list of recipients. In a shared list environment, one or more administrators may be in charge of the list. The administrators may have privilege to create and/or edit the list whereas other users may only have privilege to view and access the list. The other users may be able to alert the list when assistance is needed, but may be limited in terms of editing the list. The list of recipients 407 can encompass a group of recipients in a personal network of user 102.

Figure 6A:
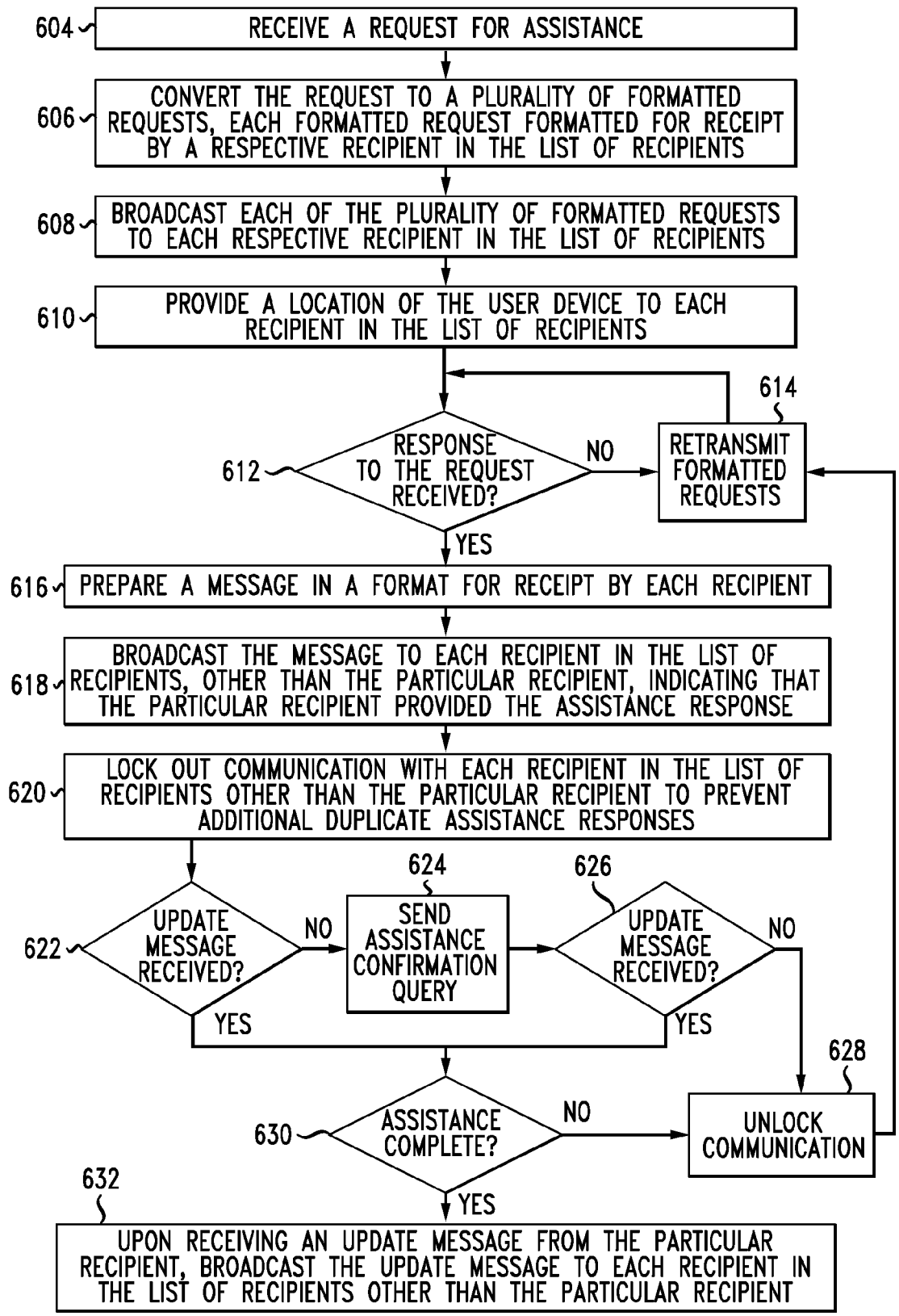
FIG. 6A is a flowchart of a method of alerting a list of recipients when a user requests assistance, in accordance with an embodiment.

FIG. 6A is a flowchart of a method of alerting a list of recipients when a user requests assistance, in accordance with an embodiment. User 102 employing user device 101 requires assistance. User 102 employs alert application 206 on user device 101 to send a request for assistance. In an embodiment, user device 101 uses interface methods such as soft key, voice activation, physical metrics, etc. to create and/or transmit the request for assistance using alert application 206 which is installed on the user device. For example, user 102 may select a soft key displayed on user device 101 when alert application 206 is opened/activated in order to send a request for assistance. User 102 may alternatively select a physical key on user device 101 when alert application 206 is opened/activated and activate the request for assistance by depressing the physical key. User 102 may use voice commands or other commands to activate the request. The type of assistance that is requested by user 102 may be selected to be sent to a particular group (e.g., recipients in the neighbors' group). User 102 may transmit the request in any format including video, audio, and/or text. In an embodiment, alert application 206 of user device 101 communicates with service provider data system 113, via network 109 in order to verify a device, service plan, and/or customer information. Alert application 206 sends the request for assistance to service provider data system 113 along with a location of the user (as determined by positioning system 205). In another embodiment, the location may be transmitted by alert application 206 separate from the request for assistance. Service provider data system 113, after verifying the device, service plan, and/or customer information, forwards the request for assistance to message system 112, via network 109. In another embodiment, alert application 206 forwards the request for assistance to message system 112, via network 109.

At step 604, a request for assistance is received. Message system 112 receives a request for assistance sent from user 102, employing user device 101. As described above, the request is created by user 102 and transmitted by user device 101 to service provider data system 113, via network 109. The request is then forwarded (after verification is performed by service provider data system 113) to message system 112, via network 109.

Intelligence module 402 of message system 112 receives the request for assistance, analyzes the request and stores the request for assistance in message storage 405. Message system 112 then queries storage 406 to obtain user 102's list of recipients 407 along with contact information (e.g., a preferred method of contacting respective recipients) of the recipients. Intelligence module 402 communicates with message status system 111 to send the identity of user 102 (e.g., user 102's phone number, user identification, etc.), the request for assistance, the list of recipients 407, and contact information including preferred method of contact for each recipient in the list. Status coordination module 302 of message status system 111 receives the user's identity, the request for assistance, the list of recipients 407, and contact information including preferred method of contact for each recipient in the list. Status coordination module 302 processes the user's identity, the request for assistance, the list of recipients 407, and contact information including preferred method of contact for each recipient in the list and creates an incident for storing in status message storage 304. Status coordination module 302 informs intelligence module 402 that the incident is logged. This way, status coordination module 302 keeps track of all updates that occur in response to the request for assistance and can instruct message system 112 to react the update(s) accordingly. For example, user 102 may be involved in an emergency or non-emergency situation in which he/she wishes to transmit a request for assistance to a list of recipients. The request for assistance may be a request for help. Status coordination module 302 keeps track of the status of the request. When the request for assistance is received by status coordination module 302, status coordination module 302 recognizes that user 102 is requesting assistance. After message status system 111, specifically status coordination module 302, creates the incident and stores the request, an acknowledgment may be sent to intelligence module 402 of message system 112. The acknowledgement informs intelligence module 402 that the incident has been created. Intelligence module 402 then informs message adaptor and generator 403 to convert the request (as described below with respect to step 606).

In an embodiment, alert application 206 may provide for display a plurality of predetermined formatted messages and/or canned status messages to user 102 to select prior to submitting the request. The canned status messages may be stored in status message storage 304 and provided to user 102, via network 109 and/or stored within user device 101. Some examples of canned status messages include "I'm lost," "I'm in a dangerous situation," "No one picked me up from _____," "There's a stranger I'm worried about," "I'm stuck on _____," "I'm stuck in a snow storm," "I've fallen," etc. In another embodiment, user device 101 may create a custom request configured by user 102. The custom request is communicated to message system 112 which then communicates the custom request to status coordination module 302. Status coordination module 302 may store the custom request in status message storage 304. Message system 112 further provides the custom request to recipients included in the list of recipients 407, as described below.

In another embodiment, an emergency message may be selected by user 102 by depressing a certain key or keystrokes, issuing a particular voice command, depressing a key in a certain pattern (e.g., double tapping), etc. For example, if the user is in an emergency situation and cannot easily type or select a canned status message, the user may depress a key that transmits a "red alert" request to service provider data system 113 that forwards it to message system 112. In another embodiment, the user may not be sure if activation of a "red alert" request is necessary, and a recipient that receives the user's request may instead determine whether to activate the "red alert" request based on the nature of the request for assistance that is sent. If the user himself/herself activates the "red alert" request, the selection of the "red alert" request for help can automatically alert the user's list of recipients of the danger that the user is in and one of the recipients can then forward the message to emergency authorities 110. Specifically, one of the recipients can send the "red alert" message to message system 112 via the alert application. Message system 112 instructs message adaptor and generator 403 to convert the request into a format receivable by emergency authorities 110. Messenger system 112 then informs message status system 111 and sends the converted request to emergency authorities 110. A user and/or an administrator may define how a "red alert" emergency is handled. For example, the user may set rules for what occurs upon activation of "red alert" request. The rules may include that emergency authorities 110 are notified, the device goes into a silent mode so that sounds on the phone are disabled, any incoming call is automatically rejected so that the user device does not ring, the device goes into a battery saving mode, the device turns off, etc., when the "red alert" request is activated. The "red alert" request is communicated to intelligence module 402 which forwards it to status coordination module 302. Status coordination module 302 transmits the "red alert" request to status message storage 304 for storage. Intelligence module 402 performs further processing.

The user may also set rules that trigger certain responses for other types of requests. For example, in case the "I'm lost" request is triggered, the user may set a rule that recipients in the list of recipients who are located within a certain vicinity of the user device are notified so that they are able to assist the user find his/her way. In another embodiment, if the user is a child and is unable to determine whether or not to activate the "red alert" request or is unable to activate the "red alert" request, an administrator (such as a parent) can manually or automatically make that determination for the child. The administrator may also set a rule that upon activation of the "I'm lost" request, a particular event is triggered. For example, if the child activates the "I'm lost" request, an automatic "red alert" request is sent to emergency authorities indicating that the child is lost along with the child's location. In another example, if an "I'm lost" request is activated, a certain person(s) in the list of recipients (such as a parent(s), grandparent(s)) are contacted and the user's device automatically dials the number of the certain person(s) who may provide the user with directions.

In an embodiment, a particular group in the list of recipients 407 may be chosen to broadcast the request for assistance to. For example, recipients identified under the family group (shown in FIG. 7) may be selected to provide the request for assistance. Therefore, the recipients in the list of recipients 407 described herein may refer to a portion of the list of recipients 407 (and not all of the recipients in the list).

Referring again to FIG. 6, at step 606, the request is converted to a plurality of formatted requests, each formatted request formatted for receipt by a respective recipient in the list of recipients. The request is converted by message adaptor and generator 403 into to a plurality of formatted requests, where each formatted request is formatted for receipt by a respective recipient in the list of recipients 407. Intelligence module 402 may receive a custom request transmitted by user 102, in step 604. The custom request may not be stored in message store 405 or may not have an equivalent canned message that is stored in message storage 405. Details regarding canned messages are described below. Intelligence module 402 forward the request to status coordination module 302, which stores the request in status message storage 304 so that future requests that include the custom request (or are similar to the custom request) will have associated stored canned messages and can be dealt with in a proper manner. Intelligence module 402 also forwards the custom request to message adaptor and generator 403. Message adaptor and generator 403 determines how to convert the request to a plurality of formatted requests so that each respective recipient in the list of recipients 407 can receive a respective formatted request. Specifically, intelligence module 402 provides message adaptor and generator 403 with instructions on how to convert respective messages to formats that can be received by respective recipients, based on the respective methods of contacts provided in the list of recipients 407. This way, each recipient is provided with a respective formatted request that the recipient can receive/view/hear, etc. For example, if the request is received from user device 101 in text form, the text may need to be converted to audio so that a recipient that is included in the list of recipients that is employing a plain old telephone service (POTS) landline phone can receive the formatted request. Message adaptor and generator 403 may use a text to audio converter in order to obtain an audio recording that can be forwarded to a recipient. The request may further need to be converted to another format by message adaptor and generator 403 prior to transmission to another recipient. The request may be sent as an attachment as well. For example, the request may be forwarded as an attachment (e.g., as a video) to an email sent to one or more recipients. In another embodiment, the request may be converted to a format that can be received by a certain type of device (e.g., a video game system that can display the request to a user employing user device 107 in FIG. 1).

In another embodiment, intelligence module 402 communicates with message storage 405 to retrieve an already converted message. Message storage 405 may store predetermined formatted messages and/or canned messages in various formats. For example, if user 102 sends the "I'm lost" request, message storage 405 may store variations of the "I'm lost" canned message. The "I'm lost" message may be stored as a text message, an audio message, or a message of a different format. In an embodiment, the "I'm lost" message may be stored in English and other languages.

In an embodiment, a recipient in the list of recipients 407 may only have an associated a phone number listed without indicating what type of phone or connection the phone is associated with. In order to determine which format(s) to convert the request to in order to deliver respective formatted requests to the recipients, message system 112 communicates with service provider data system 113. Message system 112 accesses the list of recipients 407 to determine which of the list to send respective formatted requests to. Message system 112 sends an inquiry to service provider data system 113 to determine additional details regarding the recipient's contact information. For example, suppose that the list of recipients 407 only provides a phone number for Martha without indicating what type of phone or connection Martha has. Message system 112 may send an inquiry to service provider data system 113 to determine whether the phone number listed for Martha is a landline number, a voice-over-Internet-Protocol (VoIP) number, or a cellular number (associated with a SIM card). Service provider data system 113 receives the inquiry and looks up the phone number in customer data storage 503. Service provider data system 113 then returns a response to the inquiry to inform message system 112 that Martha's phone number is a cellular number. Service provider data system 113 may provide additional information in response to the inquiry by accessing device data storage 504 and service plan storage 505. For example, service provider data system 113 may determine that Martha's device that is associated with the particular telephone number is a particular model smartphone, by accessing device data storage 504, and that the phone has an Internet data plan and is capable of accepting steaming data, by accessing service plan storage 505. This information is transmitted to intelligence module 402 so that the intelligence module may either pull a converted canned message from message storage 405 to transmit to Martha's smartphone. Otherwise, a converted message is sent to Martha's phone from message adaptor and generator 403. In another embodiment, Martha may be utilizing a non-smartphone or have a phone without a data plan. In this case, the best method of sending a converted message to Martha's phone is by SMS. Intelligence module 402 may submit an inquiry to service provider data system 113 for all recipients to determine how to submit a respective formatted request into form that is able to be received by a respective recipient.

In another embodiment, when user 102 sets up the list of recipients 407, the user may specify what type of message(s) a person included in the list of recipients is capable of receiving. For example, as shown in FIG. 7, Dennis Dudley in the list of recipients 407 may have a listed email address, a mobile number (e.g., of a smart mobile phone capable of receiving SMS and data), and a landline number. This information related to Dennis Dudley may be input by user 102 into the list of recipients 407. Dennis Dudley's preferred contact method may his mobile number. User 102 may update the list or another user that is assigned administrator privileges may update the list of recipients 407. Dennis Dudley himself may be able to update his contact information in the list.

In an embodiment, message adaptor and generator 403 transmits the formatted request(s) to intelligence module 402 for further processing.

In an embodiment, message adaptor and generator 403 stores the formatted request(s) into message storage 405 for future use by other users requiring similar assistance.

At step 608, each of the plurality of formatted requests is broadcasted to each respective recipient in the list of recipients. Intelligence module 402 broadcasts each of the plurality of formatted requests to each respective recipient in the list of recipients 407, via network 109. Intelligence module 402 simultaneously and in parallel broadcasts the formatted requests. Respective formatted requests are broadcasted for receipt by respective alert applications installed on any of user devices 104, 105, 107, and 108. Intelligence module 402 may broadcast a formatted request to a recipient in the list of recipients 407 based on that recipient's preferred contacted method. Suppose that each of the recipients in the list employ different devices that are each capable of receiving different formatted requests. Each of the recipients may employ one of user device 104, user device 105, user device 106, user device 107, and user device 108 shown in FIG. 1. Intelligence module 402 broadcasts a respective formatted request to each of these user devices. Intelligence module 402 may broadcast a formatted request in the form of a text short message service (SMS) to user device 104; broadcast a formatted request in the form of an email message to user device 105; broadcast a formatted request in the form of an audio message to user device 106; broadcast a formatted request in the form of a video message and a text message to user device 107; and broadcast a formatted request that is in a format suitable for receipt by user device 108. This way, each of the list of recipients is alerted that user 102 sent a request for assistance and a recipient can assist the user as a result of receiving the alert.

Suppose that one of the recipients is unable to receive the formatted request. For example, suppose that one of the recipients is in a limited cellular coverage area and the formatted request is sent to his/her mobile device. The formatted request may not be delivered to the recipient. Intelligence module 402 would determine that the formatted request delivery failed (e.g., the determination made by requesting a confirmation from the mobile device, pinging the mobile device, etc.) and send a respective formatted request to an alternative phone number or other device associated with that recipient. For example, if that recipient has an associated POTS phone number included in the list of recipients 407, intelligence module 402 would send the formatted request in the form of an audio message to the POTS phone number. Intelligence module 402 can dynamically determine capabilities of a recipient's device and can override the preferred contact method of a recipient by contacting the recipient using a secondary device at any time. Intelligence module 402 is adaptable and can intelligently determine how best to communicate the request to the recipients. In an embodiment, intelligence module 402 may send respective formatted requests to each phone number or device associated with a recipient. This way, the recipient may receive a respective formatted request via email, via SMS, etc. at the same time.

In another embodiment, suppose that the recipient is sent a formatted video request to his mobile device by intelligence module 402. If the recipient is in a spotty Wi-Fi or mobile data network area, the recipient may not be able to receive the video in a timely fashion. In such a situation, intelligence module 402 may determine that the recipient is experiencing issues accessing the video and may alternatively send a formatted SMS request or a formatted audio request (which may be a prerecorded message that is relayed to the recipient by calling the mobile device) to the recipient.

At step 610, a location of the user device is provided to each recipient in the list of recipients. A location of user device 101 is provided to each recipient in the list of recipients 407 receiving the formatted request. The location may be determined by positioning system 205 of user device 101 and transmitted along with or separately from the request for assistance to message system 112. In another embodiment, the location may be determined by using a triangulation method by pinging cell towers in the proximity of user device 101. In an embodiment, the location of the user device may be provided along with the formatted request (in step 608) to be broadcast to each recipient in the list by intelligence module 402. In another embodiment, the location may be provided by intelligence module 402 separate from the formatted request. If user device 101 is moving and has a dynamic position, the location may periodically be provided to the list of recipients. In an embodiment, the location of user device 101 may be provided to the list of recipients when user device 101 moves. For example, if user device 101 moves X number of feet, miles, etc., from the starting location when an initial position of the user device was recorded (and/or transmitted), a new updated position is provided to the list of recipients. In an embodiment, message system 112 may periodically request an updated location from user device 101. In another embodiment, user device 101 may transmit an updated position to message system 112, in response to an event that triggers the user device to send the update. An example of such an event is when the user device moves locations. In another embodiment, along with the location of the user device, traveling directions (e.g., driving directions, public transportation directions, and/or routing instructions of how to get to the person in need of assistance) are provided to the recipients.

In an embodiment, if the location of the user device is dynamic and changes while the user is in motion, the location information provided to each recipient would include a tracking function so that the user device can be followed in real-time or substantial real-time. The tracking function may communicate with a built-in locator beacon (positioning system 205). This way, each recipient can receive a current location of the user device when the user device is in motion. The tracking function may place a moving pin on a map, where the pin corresponds to the location of the user and the map is provided to each recipient capable of viewing the map.

At step 612, it is determined whether a response to the request is received. Message system 112 determines whether a response to the request (referred to as an assistance response) is sent by a particular recipient in the list of recipients 407. Such a response is sent by one of the recipients in order to alert everyone in the list of recipients that the recipient is willing to provide assistance or is en route to assist the user. Examples of scenarios involving some types of responses to requests are described herein in FIG. 8. Message system 112 may set a timer to wait a specified time period to determine whether or not a response to the request is received.

In response to step 612, if it determined that no response to the request is received (that is, the response is not sent by any recipient within the specified time period), the process proceeds to step 614. If message system 112 does not receive a response to the request that is broadcasted to each recipient in step 608, message system 112 rebroadcasts the formatted requests to each respective recipient, in step 614. The location of user device 102 may accompany the retransmission. If the location of user device 102 has changed since step 610, an updated location is provided to each recipient. Message system 112 may wait the specified time period in step 612 prior to sending the retransmission in step 614. For example, in a case of a non-emergency, message system 112 may set a timer of 5 minutes before determining that a response to the request is not received and rebroadcasting the request. However, in an emergency situation, the timer may be set for a shorter period of time. The timer may be configured by user 102.

After the retransmission of the request, the process again returns to step 612 and it is determined whether a response to the request is received by message system 112.

In response to step 612, if it is determined that a response to the request (i.e., an assistance response) is received, the process proceeds to step 616. If message system 112 determines that a response to the request is received (the response is sent by a particular recipient in the list of recipients 407 within the specified time period set by the timer), the message system prepares a respective message in a format for receipt by each respective recipient (other than the particular recipient) in the list of recipients 407, in step 616. Suppose that a particular recipient sends an assistance response to message system 112 to alert the message system that assistance is on the way to user 102. The assistance response may be transmitted via an alert application to message system 112 and indicate the identity of the person/recipient responding, what action the recipient is going to take, where the recipient's location is, etc. Upon receipt of the assistance response, message system 112 converts the assistance response into a plurality of formatted assistance responses, each formatted assistance response formatted for receipt by a respective recipient in the list of recipients other than the particular recipient. In an embodiment, intelligence module 402 converts the assistance response itself into multiple formatted assistance responses. Intelligence module 402 may obtain one or more predetermined formatted message(s) and/or canned message(s) from message storage 405. In another embodiment, intelligence module 402 transmits the assistance response to message adaptor and generator 403 which either converts the assistance response into the plurality of formatted assistance responses or obtains one or more predetermined formatted message(s) and/or canned message(s) from message storage 405 and provides the message to intelligence module 402 for further distribution.

In an embodiment, message system 112 may determine traveling directions from the location of user device 101 and a location of the particular recipient that responds to the request for assistance and provides the traveling directions to the particular recipient. The traveling directions may be driving directions, public transportation directions, or routing instructions of how to get to the user. The directions may be provided on a map. If the user's location is moving (or, if the particular recipient's location is moving), the directions may be updated periodically in order to provide accurate routing directions.

At step 618, the message is broadcast to each recipient in the list of recipients, other than the particular recipient, indicating that the particular recipient provided the assistance response. Intelligence module 402 broadcasts the message to each recipient in the list of recipients 407, other than the particular recipient, indicating that the particular recipient provided the assistance response. Respective messages that are in a format for receipt by each respective recipient (other than the particular recipient) in the list of recipients 407 are broadcasted to each respective recipient. This way, the other recipients are made aware that the particular recipient is willing to provide assistance or is en route to assist the user.

At step 620, communication with each recipient in the list of recipients other than the particular recipient is locked out to prevent additional duplicate assistance responses. Message system 112 locks out further communication between each recipient in the list of recipients 407 other than the particular recipient in order to prevent additional duplicate assistance responses. For example, a recipient using the alert application is locked out from responding. Since the other recipients are provided with a status that the particular recipient is providing assistance (in step 618), multiple uncoordinated responses are prevented. The other recipients, however, are kept apprised of the situation and are provided with updates. Message system 112 informs message status system 111 of the lockout and provides the identity of the particular recipient that can continue to communicate with message system 112.

If location information of user device 101 is updated, the update is communicated to the particular recipient. In particular, user device 101 (using alert application 206) sends the updated location to message system 112. Message system 112 identifies the updated location and routes the information to message status system 111. Message status system 111 recognizes the updated location and informs message system 112 to send an update including the location information to the particular recipient. Message system 112 sends the updated location.

At step 622, it is determined whether an update message is received. Message system 112 determines whether an update message is received. If the particular recipient does not provide an update message to message system 112, the process continues to step 624. Message system 112 then sends an assistance confirmation query to the particular recipient, in step 624. In an embodiment, message system 112 may set a timer to wait a specified amount of time prior to determining whether the update message is not received and sending the assistance confirmation query in step 624. The timer may be configured by user 102.

At step 626, it is determined again whether an update message is received. After submission of the assistance confirmation query, message system 112 determines whether an update message is received. If an update message is still not received by message system 112, the process continues to step 628 where the locked communication with message system 112 is unlocked. In an embodiment, message system 112 may set a timer to wait a specified amount of time prior to determining that the update message is not received, and unlocking communication with recipients' alert applications in step 628. The timer may be configured by user 102. In another embodiment, for example, in case of an emergency, a second determination for whether an update message is received in step 626 may not be made. Rather, the process may determine once whether an update message is received and then unlock communication between message system 112 and the other recipients in the list of recipients 407 after a short time period. For example, if it is important for a recipient to respond or assist user 102 in a timely fashion, there may only be a single determination of whether an update message is received. Prior to unlocking, message system 112 may receive instructions from message status system 111 to unlock communication. This way, message status system keeps track of the status of the request.

After message system 112 unlocks communication in step 628, the process returns to step 614 where the request that is converted is rebroadcasted by message system 112 to each recipient in the list of recipients 407. After the retransmission of the request, the process again returns to step 612 and it is determined whether a response to the request is received by message system 112.

In response to step 622 or step 626, if message system 112 receives an update message, the process continues to step 630. At step 630, it is determined whether assistance is complete. Message system 112 determines whether assistance is complete based on whether an update message from one of the recipients is received. If message system 112 receives an indication from one of the recipients that the assistance is incomplete or no response from any one of the recipients is received, the process continues to step 628 where communication between the recipients and message system 112 is unlocked. Message system 112 may set a timer to wait a specified amount of time prior to determining whether the assistance is complete in step 630. For example, in a case of a non-emergency, message system 112 may set a timer of 5 minutes to wait to receive an indication of whether the assistance is complete or not, or not receive an indication, before proceeding to unlock communication, in step 628. However, in an emergency situation, the timer may be set for a shorter period of time. The timer may be configured by user 102. After message system 112 unlocks communication in step 628, the process returns to step 614 where the request that is converted is rebroadcasted by message system 112 to each recipient in the list of recipients 407. After the retransmission of the request, the process again returns to step 612 and it is determined whether a response to the request is received by message system 112.

If the particular recipient provides an update message to message status message system 112 (within the set time period) indicating that the particular recipient has completed (or is in the process of completing) assistance to user 102, it is determined that the assistance is complete and the process continues to step 632. In step 632, upon receiving an update message from the particular recipient, the update message is broadcast to each recipient in the list of recipients other than the particular recipient. The update message may be converted into a plurality of formatted updated messages, each formatted update message suitable for receipt by a respective recipient (as described above), prior to being broadcasted to each respective recipient. In another embodiment, a predetermined formatted message and/or canned message stored in message storage 405 is broadcasted to each recipient in the list of recipients other than the particular recipient, in step 632.

When a status message (an update, etc.) is received by message status message system 112, the status message is communicated to status coordination module 302. Status coordination module 302 keeps track of the current status of the situation (e.g., is someone helping the user, who is helping the user, is the request complete, etc.) and may receive messages, directly or via message system 112, that are sent by users employing user devices.

Suppose that user 102 sets up a core network. A portion of the recipients in the list of recipients 407 are included in the core network. The core network may include recipients that will always receive a request sent by user 102, regardless of the nature of the request. Suppose that user 102 sets up his/her core network to include Martha, Aunt Bertha, and Timothy Allen. The core network may be listed as a separate list within the list of recipients 407 (not shown). Each recipient in the core network is listed as belonging to the core network, as depicted in FIG. 7. The column called "Listed in" 704 identifies which users are included in the core network group. In another embodiment depicted by FIG. 7, people included in the core network may be identified by a marker, such as a pair of asterisks or stars around their name. In another embodiment, recipients included in the core network may have their name and/or avatar highlighted or differentiated from non-core members in some manner.

Figure 6B:
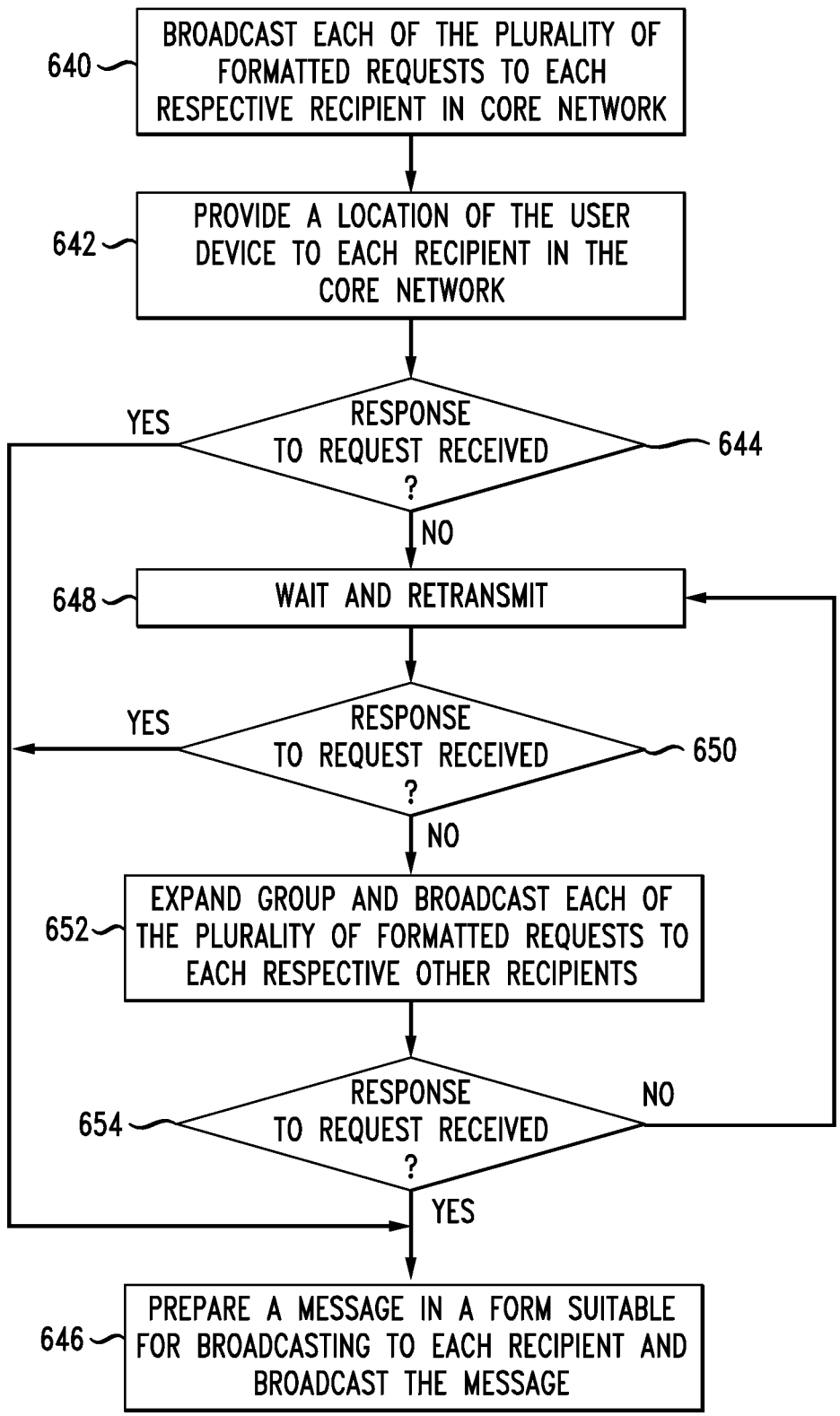
FIG. 6B is a flowchart of a method of alerting a core network and others when the core network is not responsive, in accordance with an embodiment.

Suppose that no members of the core network respond to user 102's request. If this occurs, the core network is expanded such that other recipients can instead offer assistance. FIG. 6B describes how members of the core network are contacted, and what occurs when the core network members do not respond to the request. Specifically, FIG. 6B is a flowchart of a method of alerting a core network and others when the core network is not responsive, in accordance with an embodiment. Suppose that a core network in the list of recipients 407 is configured by user 102. The user may define members of the core network using one of the processes described above. User 102 sends a request for assistance that is received by message status message system 112. Message adaptor and generator 403 converts the request into a plurality of formatted requests where each formatted request is formatted for receipt by a respective recipient (similar to steps 602, 604, and 606 of FIG. 6A) in the core network. At step 640 of FIG. 6B, each of the plurality of formatted requests is broadcasted to each respective recipient in the core network. Intelligence module 402 broadcasts each of the plurality of formatted requests to each respective recipient in the core network, via network 109. Intelligence module 402 simultaneously and in parallel broadcasts the formatted requests. Intelligence module 402 may broadcast a formatted request to a recipient in the core network based on that recipient's preferred contacted method.

At step 642, a location of the user device is provided to each recipient in the core network. A location of user device 101 is provided to each recipient in the core network as determined by positioning system 205 of user device 101. The location may be transmitted along with or separately from the request sent by user device 101. In an embodiment, the location of the user device may be provided along with the formatted request (in step 640) for broadcasting to each recipient the core network. In another embodiment, the location may be provided separate from the formatted request. The location is provided in a similar manner as in step 610 of FIG. 6A.

At step 644, it is determined whether a response to the request is received. Message system 112 determines whether a response to the request (referred to as an assistance response) is received, where the response is sent by a particular recipient in the core network. Such a response is sent by one of the recipients to alert everyone in the core network that the recipient is willing to provide assistance or is en route to assist the user. Examples of scenarios involving some types of responses are described herein in FIG. 8.

In response to step 644, if it is determined that a response to the request (i.e., an assistance response) is received, the process proceeds to step 646. At step 646, if message system 112 determines that a response to the request is received (the response is sent by a particular recipient in the core network), the message system converts the message into a plurality of formatted messages, where each formatted message can be received by a respective recipient in the core network. Each of the formatted messages is broadcasted to each respective recipient, other than the particular recipient, indicating that the particular recipient provided the assistance response. Specifically, intelligence module 402 broadcasts formatted messages. This way, the other recipients are made aware that the particular recipient is willing to provide assistance or is en route to assist the user. After the broadcast is made, message system 112 locks out communication with other recipients, determines whether an update message is received in order to determine if the assistance is complete and informs the core network when assistance is complete by broadcasting an update message to each recipient in the core network other than the particular recipient, similar to steps 620, 622, 630, and 632 of FIG. 6A. If message system 112 determines that the update message is not received, that is message status system 111 does not receive information from message system 112 that someone took action, an assistance confirmation query is sent and it is again determined whether an update message is received, similar to steps 622, 624, and 626 of FIG. 6A. If an update message is not received, message system 112 unlocks communication and the request that is converted into a plurality of formats is rebroadcasted, similar to steps 628 and 614 of FIG. 6A. If, however, an update is received indicating that assistance is incomplete, message system 112 unlocks communication and the request that is converted is rebroadcasted, and an updated location of the user (if available) is broadcasted, similar to steps 630, 628 and 614 of FIG. 6A.

In response to step 644, if it is determined that a response to the request that is converted (i.e., an assistance response) is not received, the process proceeds to step 648. If a response to the request that is converted is not received by message system 112, then message system 112 sets a timer and waits a specified period of time (set by the timer) before rebroadcasting the request that is converted and broadcasting the updated location of the user (if available). Message system 112 rebroadcasts each of the plurality of formatted requests to each respective recipient in the core network and broadcasts the updated location of the user (if available). The timer may be contingent on a nature of the request. For example, if there is the request sent by user 102 that is indicative of an emergency, then the timer may be short (e.g., 30 seconds). If however, the request is indicative of a non-emergency (e.g., a child forgot to bring his/her lunch to school), then the timer may be set for a longer period of time. Therefore, the timer is dynamic and is set based on a nature of the emergency. The timer may be configured by user 102. In another embodiment, message system 112 may determine an appropriate amount of time to set the timer to based on the nature of the request sent by the user. If the nature of the request is critical, then the timer advances more quickly. Details regarding how the nature of the request is determined are described below.

At step 650 it is determined whether a response to the request is received within the specified time period set by the timer. Message system 112 determines whether a response to the request that is converted is received after within the specified time period. If a response is received, the process continues to step 646. If a response is not received, the process continues to step 652.

At step 652, the group is expanded to include other recipients and the request that is converted into a plurality of formatted requests (and updated location, if available) is broadcasted to each respective other recipients that were not listed as being a part of the core network group. If no one responds to the request that is converted, then message system 112 expands the core network group to include additional recipients and broadcasts each of the plurality of formatted requests to each respective additional recipient that is not included within the core network. Message system 112 queries storage 406 in order to expand the network, as storage 406 stores all recipient information. For example, recipients associated with the family group may be added as additional recipients and each new recipient is sent the request (and an updated location, if available). If a respective formatted request does not exist in a format that can be received by one or more additional recipients, then message system 112 converts the request accordingly, as in step 606 in FIG. 6A. The group may be expanded to include new recipients that are not previously provided in the list of recipients. User 102 may append the list to add new recipients.

The message system may determine how far to expand the core network based on a nature of the request. For example, in case of an emergency, message system 112 may determine that everyone in the list of recipients should be informed of the request and broadcasts the request that is converted, accordingly. As described above with respect to FIG. 6A, the request is converted such that it is in a respective format suitable for receipt by a respective recipient. The nature of the request may be determined by message system 112 (or input by user device 101). If a message is a "red alert" type message, which is highest level emergency request, all recipients are contacted/alerted. If the nature of the request is not as urgent, message system 112 may determine to expand the user's core network to include additional recipients, but not all recipients. A request that is not as urgent may trigger message system 112 to expand the core network to include other recipients in the list of recipients 407. For example, Dennis Dudley may be added to the expanded core network and may be contacted. In another embodiment, the recipients that are included in the buds group may be added to the expanded core network. Each time message system 112 determines that a response to the request is not received, in step 654, the process returns to step 648 and 650. If a response is still not received by a second iteration, the core network is again expanded at step 652 to include more recipients in addition to the additional recipients that were previously added to the core network. Message system 112 intelligently expands the core network to include additional recipients. At each iteration, additional recipient(s) are added and the process continues until a response is received. The process than continues to step 646 upon receiving a response.

Suppose that a child forgets to bring his/her lunch to school. A core network including his/her mom and dad could be contacted initially to inform them that the child forgot to bring lunch. If the mom and dad do not respond to his request after X amount of time set by a timer, the core network expands to alert his/her siblings. If again no response is received, the core network expands again to include aunts and uncles, then grandparents, then neighbors, then teachers, then the school principal, etc.

User 102 may not employ a mobile device in order to send a request. User 102 may use any other device that can communicate with message system 112. The device can additionally be able to communicate a nature of the request and provide a location to message system 112.

Figure 8A:
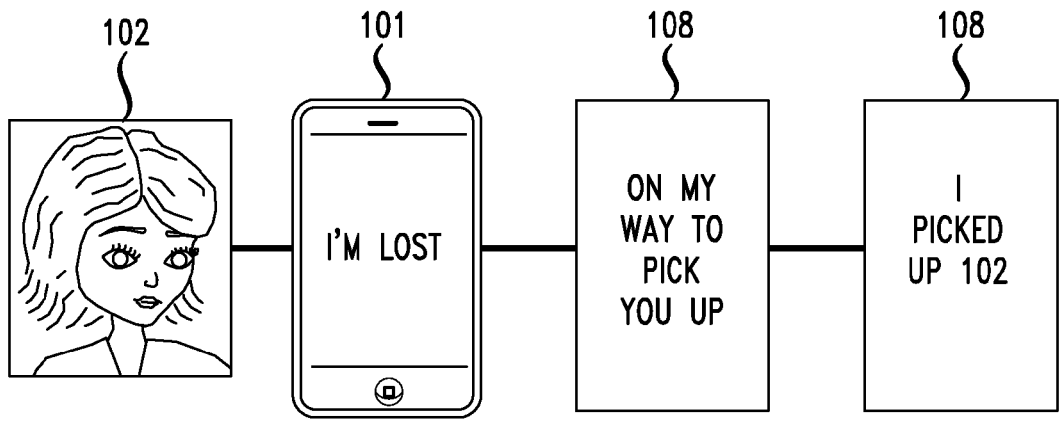
FIGS. 8A though 8F depict exemplary scenarios of a user requesting assistance, in accordance with an embodiment.

FIGS. 8A though 8F depict exemplary scenarios of a user requesting assistance, in accordance with an embodiment. In FIG. 8A, user 102 employing user device 101 is lost. User 102 wants to send a request for help. User 102 launches a mobile application that allows a request for assistance to be sent to recipients in the list of recipients 407. User 102 selects a predetermined formatted messages and/or canned status message that states "I'm lost". User device 101 may provide a graphical user interface that provides the user with a plurality of predetermined formatted message and/or canned messages stored at status message storage 304 to select from. The messages may be sorted as a list, provided using a drop-down menu, sorted based on categories of emergencies, etc. Upon selection of the canned "I'm lost" request message by the user, the request message is transmitted to message system 112. The message is communicated to intelligence module 402 which transmits it to message adaptor and generator 403. Message adaptor and generator 403 converts the message into a plurality of formatted requests. In an embodiment, in order to convert the message, the message adaptor and generator obtains canned messages stored in various formats from message storage 405. In another embodiment, intelligence module 402 directly obtains canned messages stored in various formats from message storage 405. Suppose that one of the recipients in the list of recipients is employing a mobile device capable of receiving SMS messages. Intelligence module 402 transmits the SMS message to the recipient mobile device, user device 108. In response, user device 108 responds to the request by texting back "On my way to pick you up." Message system 112 receives the text. Since user device 108 is the first recipient to respond, communication with other recipients is locked out by message system 112. The other recipients are provided with a message broadcast stating that the user employing user device 108 is providing assistance. When the user employing user device 108 picks up user 102, he/she texts again an update message to message system 112 stating "I picked up 102." The text is sent to message system 112, (which is in communication with message status system 111) which again broadcasts the text to the other recipients in the list of recipients 407. Along with the text, a canned status message stored in status message storage 304 may be transmitted. The canned message may state "Person X has picked up user Y. Person X states . . . " Person X is the person providing assistance to user Y. In this embodiment, suppose that person X is Aunt Bertha and user Y (user 102) is Dorothy. Message system 112 may broadcast a message stating: "Aunt Bertha has picked up Dorothy. Aunt Bertha states 'I picked up Dorothy".

Similarly, user 102 may transmit a custom or canned status request stating that "No one picked me up from school," "I'm stuck in a snow storm," "I ran out of gas," "I have a flat tire," etc. In case that user 102 requires a service, such as a tow truck, message system 112 may communicate with user 102 to obtain a credit card or other method of payment. In an embodiment, method system 112 may store a login to the user's bank account or securely store the user's credit card number. Message system 112 may submit payment to the tow truck company that is the first to reply to the user's request for assistance. This would encourage business to supply fast assistance to a customer requesting help.

Figure 8B:
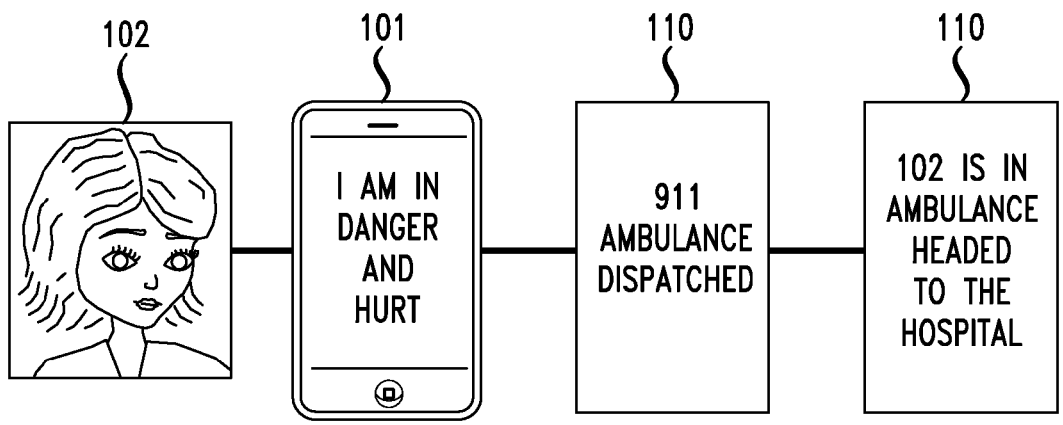

In FIG. 8B, an emergency request is received by message system 112. The emergency request may be transmitted by activation of a "red alert" request. User 102 may transmit a custom or canned request stating "I am in danger and hurt." The nature of this request may be considered a level 10 request or be the most critical. Along with alerting the recipients, message system 112 would forward the request to emergency authorities 110 along with a location of the user. If the user's location is changing, (e.g., if the user is kidnapped and being transported in a vehicle), location information is continuously transmitted using the tracking function so the user's real-time location is provided to the emergency authorities. In this embodiment, user device 101 may go into a silent mode or other mode so that the kidnappers are not made aware that the user is trying to contact emergency authorities. When the emergency authorities receive the request, they may provide a response message to message system 112 indicating that police or ambulance personal are en route. When authorities reach user 102, an update message may be sent by emergency authorities 110 indicating that 102 is in an ambulance headed to the hospital and the request is complete. In another embodiment, user 102 may send a message that completes the request and informs others in the list of recipients 407 that the situation has been dealt with.

In another embodiment, suppose that user 102 is in an emergency situation and needs to inform the list of recipients 407 of the emergency. User 102 may transmit a custom request indicating that he/she is stuck on a remote island where a tsunami is about to hit. One of the recipients may respond to the request by indicating that he has called a helicopter company to provide a helicopter to rescue user 102. When user 102 is rescued, either the helicopter company informs the recipient and the recipient transmits an update message indicating that user 102 is safe or user 102 himself/herself transmits such a message which is provided to the other recipients and the request is complete. In an embodiment, when user 102 transmits the request, his/her user device may enter into a battery saving mode based on the nature of the emergency.

Figure 8C:
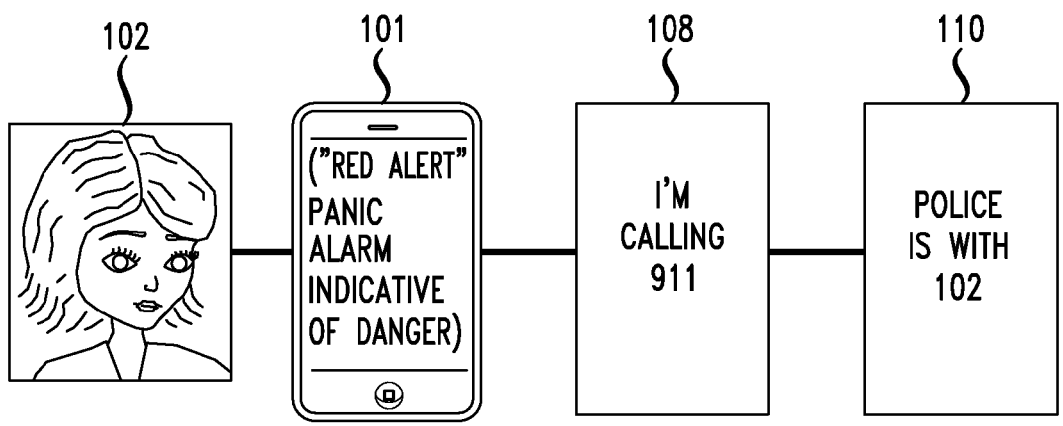

In FIG. 8C, user 102 activates the "red alert" request by one of the methods described above. The request may be received by a particular recipient employing user device 108 in the list of recipients 407. The particular recipient may transmit a response message stating "I'm calling 911" which is relayed to the other recipients in the list of recipients. When emergency authorities 110 assist user 102, emergency authorities 110 send an update message to message system 112 indicating that "Police is with 102" and the message is broadcasted to the recipients in a respective format for receipt by a respective recipient by intelligence module 402. In this embodiment, although communication with other recipients is locked, communication with emergency authorities 110 is not locked. Therefore, emergency authorities 110 can provide a status update at any time.

Suppose that a user is uncertain whether to call emergency authorities or is unable to connect to emergency authorities. For example, suppose a child is witnessing a fight between two friends. The child may activate the alert system by sending a request for assistance to his parents. The request may indicate that the child is witnessing a fight. The child's parents may determine it is best to contact the authorities, once the request is received and activate the "red alert" request. Therefore, the parents may contact emergency authorities by using the "red alert" request and emergency authorities can be deployed the child's location to handle the fight.

Figure 8D:
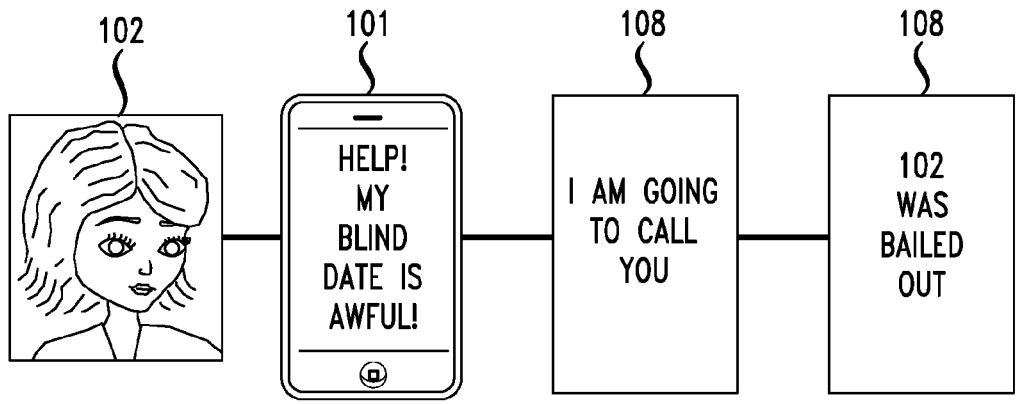

In FIG. 8D, user 102 is in a non-emergency situation and is need of assistance. User 102 is out on a blind date and transmits a request stating "Help! My blind date is awful!" which is sent to her list of recipients. A recipient employing user device 108 sends a response to the request stating "I am going to call you." Others in the list of recipients are kept informed of the situation and when the recipient sends an update message stating "102 was bailed out," the others in the list of recipients are informed.

Figure 8E:
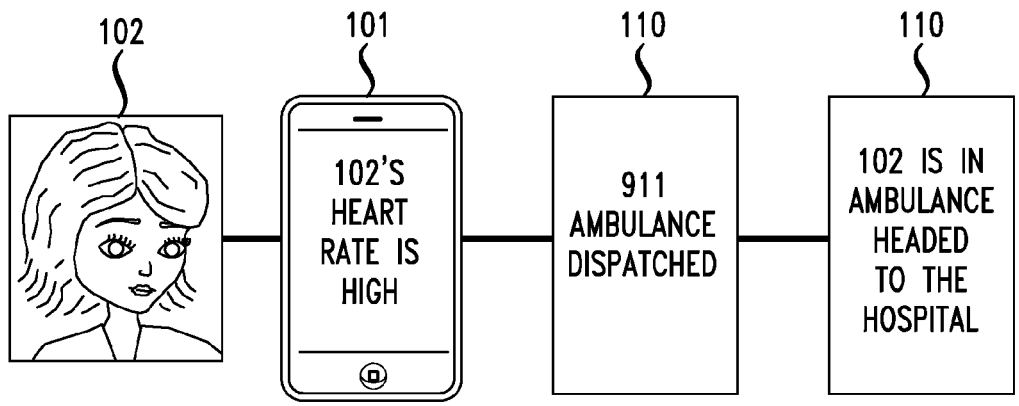

In FIG. 8E, user 102 is wearing user device 101. User device 101 may be clothing smart tag including a sensor that can be affixed to clothing, a smart shirt, smart watch, smart glasses, smart contact lenses, heart rate monitor, exercise watch, a smart arm band, a Bluetooth ear piece, a device embedded underneath a user's skin, or other wearable device. User 102 may activate a request by tapping on the user device once or a few times to activate a tactile response, speak into a microphone that interprets the request, etc. In an embodiment, user device 101 may be activated automatically based on vital intensity, heart beat, galvanic skin response (GSR), sweat levels, etc. Suppose that the user is wearing a smart shirt. The shirt may measure user 102's vitals and determine that the vitals fall within a dangerous range. User device 101 may transmit a request stating that "102's heart rate is high" based on measurement of user 102's vitals. Along with the request, the address of the user's house where the user is located is transmitted. The request is transmitted to emergency authorities 110. Emergency authorities 110 inform message status 112 when 911 ambulance is dispatched. Upon reaching 102's house, emergency authorities 110 provide an update message that "102 is in an ambulance headed to the hospital."

In another embodiment, if user 102 is feeling dizzy at the gym, he/she may tap twice on the back of his/her neck to activate a Bluetooth device connected to a mobile device which sends a request for medical help. Emergency authorities 110 are alerted by message system 112 to assist the user.

In another embodiment, suppose user 102 has a disability or a condition such as Alzheimer's disease. User device 101 may track user 102's location and if user 102 goes outside a certain range of his/her location, a request is broadcasted to the list of recipients. Suppose user 102 strays too far outside his home and gets lost or drives beyond a radius of X number of miles away from his/her house and gets lots. User device 101 keeps track of his/her location and transmits the request for assistance along with the location (which may be dynamic) so that a family member or neighbor in the list of recipients can help.

Figure 8F:
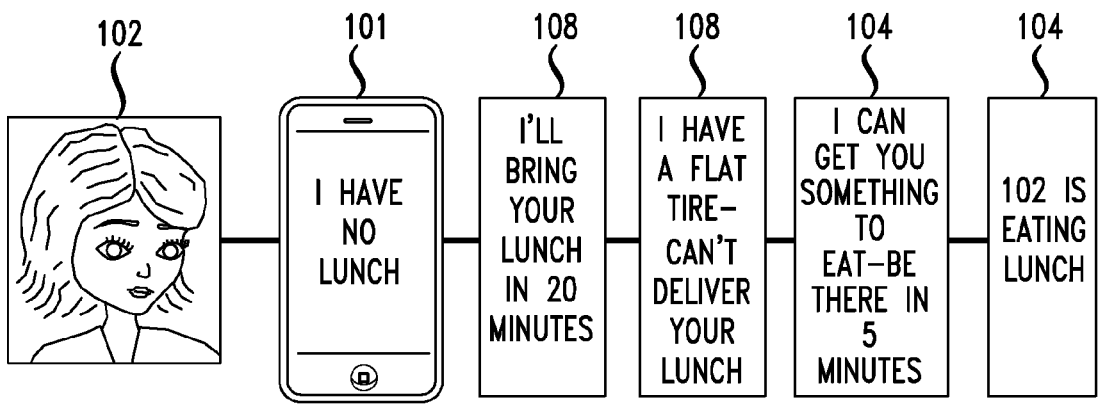

In FIG. 8F, user 102, a child, sends a request stating "I have no lunch." The user's mom employing user device 108 may reply back stating "I'll bring your lunch in 20 minutes." However, before arriving at the child's school, the mom may get a flat tire and dispatch her own request for assistance. In the meantime, message system 112 may unlock communication because the mom is unable to assist the child. The dad employing user device 104 may receive the retransmission of the formatted request or receive the mom's message and reply back "I can get you something to eat—be there in 5 minutes." When the dad delivers the lunch to the child, the dad may send an update message stating "102 is eating lunch."

In another embodiment, alert system of the present application can be added on as an application to an existing social network, a personal or family tracking and mapping application, a health tracker application, etc.

Figure 9:
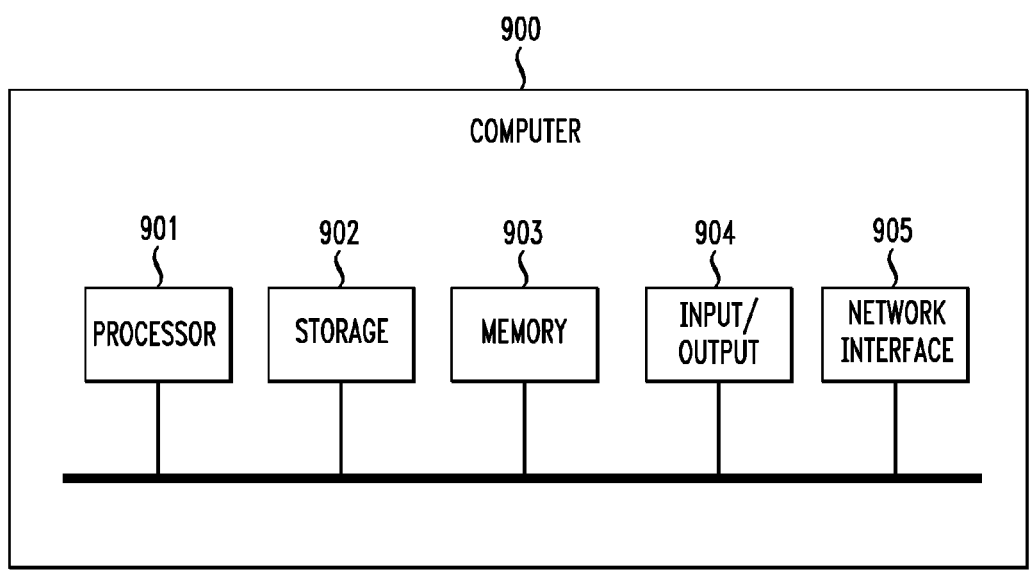
FIG. 9 illustratively depicts components of a computer that may be used to implement various embodiments.

A high-level block diagram of an exemplary computer that may be used to implement systems, apparatus and methods described herein is illustrated in FIG. 9. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Thus, the method steps of FIG. 9 can be defined by the computer program instructions stored in memory 903 and/or data storage device 902 and controlled by the processor 901 executing the computer program instructions. For example, the computer program instructions can be implemented as computer executable code programmed by one skilled in the art to perform an algorithm defined by the method steps of FIG. 9. Accordingly, by executing the computer program instructions, the processor 901 executes an algorithm defined by the method steps of FIG. 9. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in, one or more application-specific integrated circuits (ASICs) and/or one or more field programmable gate lists (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, including sender user device 101, user device 104, user device 105, user device 106, user device 107, user device 108, message status system 111, message system 112, service provider data system 113, positioning system 205, status coordination module 302, intelligence module 402, and message adaptor and generator 403 may be implemented using a computer such as computer 900.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving a request for assistance from a user employing a first user device;
   converting the request into a plurality of formatted requests, each formatted request formatted for receipt by a respective recipient in a list of recipients;
   broadcasting each of the plurality of formatted requests to each respective recipient in the list of recipients;
   providing a location of the first user device to each recipient in the list of recipients;
   receiving an assistance response to the request, the assistance response sent by a particular recipient in the list of recipients;
   broadcasting a message to each recipient in the list of recipients, other than the particular recipient, indicating that the particular recipient provided the assistance response;
   upon receiving an update message from the particular recipient, broadcasting the update message to each recipient in the list of recipients other than the particular recipient; and
   locking out communication with each recipient in the list of recipients other than the particular recipient to prevent additional duplicate assistance responses.

2. The method of claim 1, further comprising:
   receiving an indication that the particular recipient has not completed assisting the user;
   unlocking communication with each recipient in the list of recipients other than the particular recipient; and
   receiving a second assistance response to the request sent by a second recipient in the list of recipients.

3. The method of claim 1, wherein the assistance response is received within a specified time.

4. The method of claim 1, wherein the particular recipient is employing a second user device, the method further comprising:
   determining traveling directions from the location of the first user device to a location of the second user device; and
   providing the traveling directions to the particular recipient.

5. The method of claim 1, wherein the request for assistance is a request for help and wherein one of the recipients of the list of recipients is an emergency authority.

6. The method of claim 1, wherein a portion of the list of recipients is included in a core network, the method further comprising:

expanding the core network to include additional recipients;

broadcasting each of the plurality of formatted requests to a respective recipient of the additional recipients; and if a response to the request is not received, expanding the core network to include more recipients in addition to the additional recipients.

7. An apparatus comprising:

a processor; and a memory to store computer program instructions, the computer program instructions when executed on the processor cause the processor to perform operations comprising:

receiving a request for assistance from a user employing a first user device;

converting the request into a plurality of formatted requests, each formatted request formatted for receipt by a respective recipient in a list of recipients;

broadcasting each of the plurality of formatted requests to each respective recipient in the list of recipients;

providing a location of the first user device to each recipient in the list of recipients;

receiving an assistance response to the request, the assistance response sent by a particular recipient in the list of recipients;

broadcasting a message to each recipient in the list of recipients, other than the particular recipient, indicating that the particular recipient provided the assistance response;

upon receiving an update message from the particular recipient, broadcasting the update message to each recipient in the list of recipients other than the particular recipient; and locking out communication with each recipient in the list of recipients other than the particular recipient to prevent additional duplicate assistance responses.

8. The apparatus of claim 7, the operations further comprising:

receiving an indication that the particular recipient has not completed assisting the user;

unlocking communication with each recipient in the list of recipients other than the particular recipient; and receiving a second assistance response to the request sent by a second recipient in the list of recipients.

9. The apparatus of claim 7, wherein the assistance response is received within a specified time.

10. The apparatus of claim 7, wherein the particular recipient is employing a second user device, the operations further comprising:

determining traveling directions from the location of the first user device to a location of the second user device; and providing the traveling directions to the particular recipient.

11. The apparatus of claim 7, wherein the request for assistance is a request for help and wherein one of the recipients of the list of recipients is an emergency authority.

12. The apparatus of claim 7, wherein a portion of the list of recipients is included in a core network, the operations further comprising:

expanding the core network to include additional recipients;

broadcasting each of the plurality of formatted requests to a respective recipient of the additional recipients; and if a response to the request is not received, expanding the core network to include more recipients in addition to the additional recipients.

13. A computer readable device storing computer program instructions, which, when executed on a processor, cause the processor to perform operations comprising:

receiving a request for assistance from a user employing a first user device;

converting the request into a plurality of formatted requests, each formatted request formatted for receipt by a respective recipient in a list of recipients;

broadcasting each of the plurality of formatted requests to each respective recipient in the list of recipients;

providing a location of the first user device to each recipient in the list of recipients;

receiving an assistance response to the request, the assistance response sent by a particular recipient in the list of recipients;

broadcasting a message to each recipient in the list of recipients, other than the particular recipient, indicating that the particular recipient provided the assistance response;

upon receiving an update message from the particular recipient, broadcasting the update message to each recipient in the list of recipients other than the particular recipient; and locking out communication with each recipient in the list of recipients other than the particular recipient to prevent additional duplicate assistance responses.

14. The computer readable device of claim 13, the operations further comprising:

receiving an indication that the particular recipient has not completed assisting the user;

unlocking communication with each recipient in the list of recipients other than the particular recipient; and receiving a second assistance response to the request sent by a second recipient in the list of recipients.

15. The computer readable device of claim 13, wherein the assistance response is received within a specified time.

16. The computer readable device of claim 13, wherein the particular recipient is employing a second user device, the operations further comprising:

determining traveling directions from the location of the first user device to a location of the second user device; and providing the traveling directions to the particular recipient.

17. The computer readable device of claim 13, wherein the request for assistance is a request for help and wherein one of the recipients of the list of recipients is an emergency authority.

* * * * *